United States Patent [19]

FitzGerald et al.

[11] Patent Number: 5,454,720
[45] Date of Patent: Oct. 3, 1995

[54] METHOD FOR ELIMINATION OF AMBIGUOUS SOLUTIONS IN A HYPERBOLIC POSITIONING SYSTEM

[75] Inventors: Mark R. FitzGerald, Phoenix; Craig T. Griffin, Chandler; Glen E. Sater, Phoenix, all of Ariz.

[73] Assignee: Motorola, Inc., Schaumburg, Ill.

[21] Appl. No.: 251,153

[22] Filed: May 31, 1994

[51] Int. Cl.⁶ .................................................... F41G 3/26
[52] U.S. Cl. ............................... 434/27; 434/16; 564/449; 564/460; 367/129; 342/457; 273/310
[58] Field of Search .......................... 434/11, 12, 16, 434/19, 23, 27; 364/423, 449, 458, 460, 516, 578; 273/32 R, 310, 439; 340/326; 367/129; 342/450, 451, 457, 458, 465

[56] References Cited

U.S. PATENT DOCUMENTS

| | | | |
|---|---|---|---|
| 3,643,166 | 2/1972 | McCurnin et al. ............ | 364/423 X |
| 4,024,383 | 5/1977 | Beasley ........................... | 364/449 |
| 4,682,953 | 7/1987 | Doerfel et al. ................. | 434/16 |
| 4,807,202 | 2/1989 | Cherri et al. ................... | 367/129 |
| 4,910,677 | 3/1990 | Remedio et al. .............. | 273/32 R X |
| 4,976,619 | 12/1990 | Carlson . | |
| 5,056,106 | 10/1991 | Wang et al. ................... | 364/460 X |
| 5,119,102 | 6/1992 | Barnard .......................... | 342/457 X |
| 5,173,710 | 12/1992 | Kelley et al. .................. | 342/457 X |
| 5,292,254 | 3/1994 | Miller et al. ................... | 434/23 X |
| 5,382,958 | 1/1995 | FitzGerald ...................... | 434/16 X |

Primary Examiner—Joe H. Gheng
Attorney, Agent, or Firm—Frank J. Bogacz

[57] ABSTRACT

A method for providing detection of timing anomalies and eliminating falsely detected positions in a hyperbolic positioning system for a simulated battlefield system. The method selects a large number of transmitters for calculation of position of an object or person on the battle field. In addition, transmitters are selected which have a high dilution of precision factor.

20 Claims, 7 Drawing Sheets

METHOD FOR ELIMINATION OF AMBIGUOUS SOLUTIONS IN A HYPERBOLIC POSITIONING SYSTEM

GOVERNMENT LICENSE RIGHTS

The U.S. Government has a paid-up license in a portion of this invention and the right in limited circumstances to require the patent owner to license others to such portion on reasonable terms as provided for by the terms of contract no. DABT60-89-C-1445 awarded by the U.S. Army.

BACKGROUND OF THE INVENTION

The present invention pertains to position location systems and more particularly to a method for eliminating false positions detected in a hyperbolic positioning system.

Most positioning systems utilizing radio frequency or sound to position objects are hyperbolic, which means that the timing relationships between multiple signals to or from multiple sites with fixed timing relationships form sets of intersecting hyperbolas. This is true in cases where multiple transmissions from reference points are received at an unknown location, such as the GPS, LORAN, and the MOTOROLA CATIES (Combined Arms and Training Integrated Evaluation System) systems, or when a single transmission from an unknown location is received at multiple reference points, such as the RDMS (Range Data Measurement System) at the US Army National Training Center.

This hyperbolic nature can be demonstrated using a typical multi-lateration scheme in which signals are transmitted omni-directionally from several stationary transmitters with a specific timing relationship. As signals from each transmitter propagate at the speed of light away from the transmitters, receivers measuring the timing relationship between two signals would, measure identical intervals at a locus of points. The formula for this set of points is $D1-D2=K1$, where D1 is the distance from transmitter #1, D2 is the distance from transmitter #2, and the constant K1 is the difference in timing between the two signals. This equation is, in two dimensions, a hyperbola. These two signals are insufficient to determine position since it cannot be established where on the hyperbola the receiver resides. Another data point is required from another transmitter. Using one of the three received signals (#1) as a time reference results in two intersecting hyperbolas ($D1-D2=K1$, and $D1-D3=K2$). The receiver can then use the measured time intervals to determine the location where the two hyperbolas meet. The intersection of two hyperbolas is not directly solvable so an iterative method such as least squares is used to drive the solution from an initial estimate towards the location that comes closest to meeting the measured timing data. Under most circumstances, the location converges towards the true location of the receiver.

Since hyperbolas are not straight lines, there is a high probability that they intersect at more than one location. By definition, both intersections share the exact same timing relationships and a receiver at either location cannot differentiate between them purely by measuring the timing intervals. Most of the time the system will resolve the correct location because the second intersection is sufficiently far away or the initial estimate is close to the true location. In general, large baselines and/or good geometries as defined by low Dilution Of Precision (DOP) values and filtering of previous position data reduce the probability of resolving to a false location, they do not prevent false locations from being detected.

Several methods used in multi-lateration systems that increase the accuracy of the positioning and provide some protection against false positioning are large baselines, using more than three transmitters, filtering data over time, and utilizing quantitative geometric selection methods. These are discussed below with respect to false positioning.

1. Large geometries, such as GPS and LORAN, are susceptible to false positions, but since the distance between the system elements is so large, the curvature of the hyperbolas is small and the second intersection is very far away.

2. Using more than three transmitters provides more timing data which usually results in more accurate positions. It also provides some redundancy so that three or more signals are received, even if one or more are blocked. This method reduces the chances of false positions somewhat because if all the signals are received, more hyperbolas are created. Four transmitters causes three hyperbolas and it is far less likely that three separate hyperbolas will intersect at the same two locations. Five or more transmitters reduce the chances even more.

3. Another method designed to increase positioning accuracy is to pick an optimum geometry to minimize errors. Common methods such as Horizontal Dilution of Precision (HDOP) mathematically select a set of transmitters with the most diverse angular spacing around the area in which positioning is desired. This also has the effect of selecting hyperbolas that intersect at the largest angles, thus reducing the chances that the hyperbolas will intersect nearby. The major weakness of algorithms such as HDOP is that they are valid at the intersection of the hyperbolas only and do not give any indication of how fast the geometry degrades in a specific direction to the point where a false positioning may occur. It also assumes all signals are received.

4. Filtering the data over time allows previous positions to be used to generate an initial position estimate instead of the intersection of the hyperbolas. If the previous position is accurate, it significantly increases the chances that the algorithm converges to the correct location. It also allows large jumps caused by an erroneous position to be discarded.

While additional transmitters, geometrical selection, and filtering work well in theory, they do not always perform well in actual situations because signal blockages from hills, buildings, foliage, and vehicles can reduce the number of signals received. Also, large geometries, such as satellites, are not always practical. What is needed in these situations is a method to predict situations where insufficient timing data can result in false positions in real time or that can use the data set to select the optimum data to generate a unique solution.

DESCRIPTION OF THE PREFERRED EMBODIMENT

Figure 1:
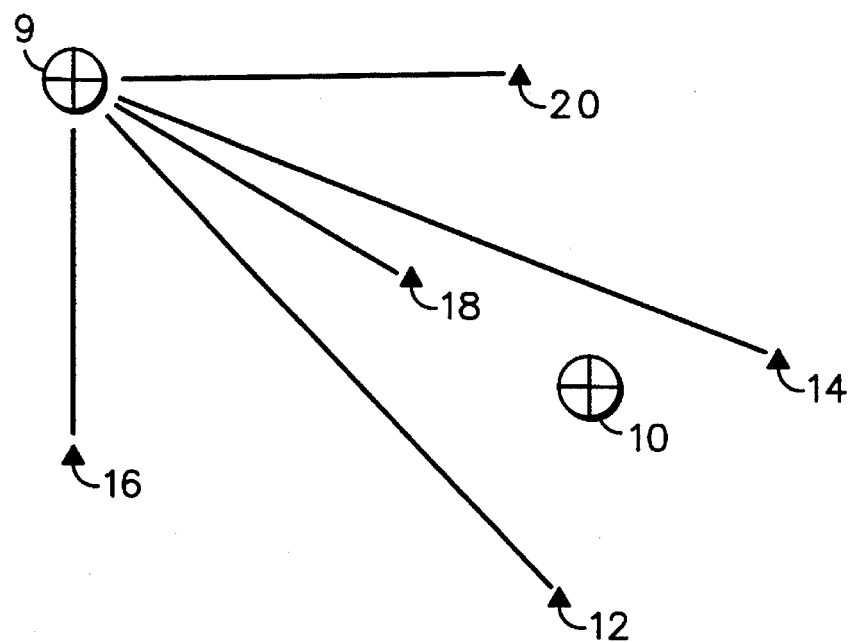
FIG. 1 is a layout of a position location system including actuators in a simulated battlefield.

In a position determination system, this invention analyzes the geometry in real time to anticipate failures in geometry selection or signal blockages that can lead to false positions. FIG. 1 shows a typical layout of a multilateration system such as the CATIES system at the US Army's National Training System. This system uses up to 5 transmitters (actuators) (12, 14, 16, 18, and 20) that transmit with specific timing relationships so that signals arrive at a reference point 10 with a fixed timing relationship. False location 9 is shown. A relative position is self-determined by a receiver that measures the timing relative to the first signal and implements an algorithm to estimate the location based on the data.

Figure 2:
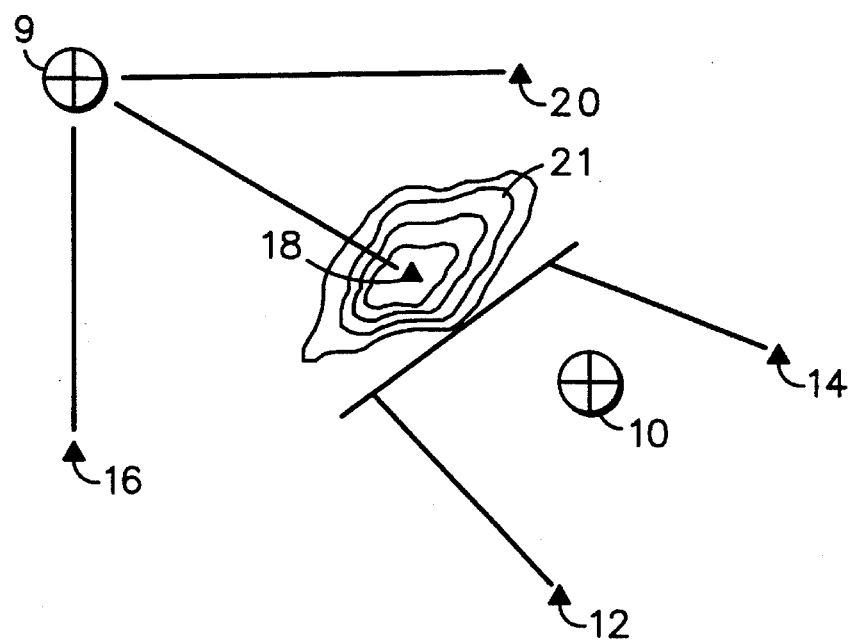
FIG. 2 is a layout of a position location system including actuators in a simulated battlefield with a mountain.
Figure 3:
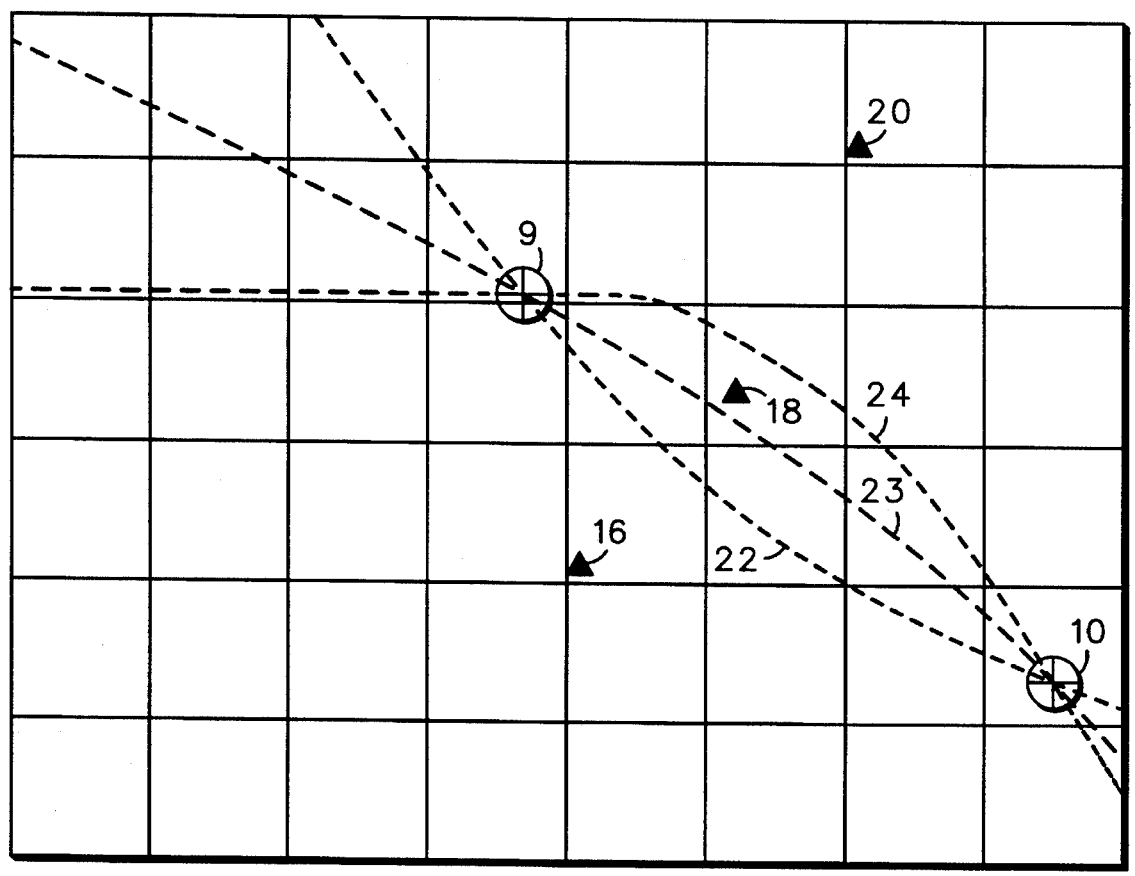
FIG. 3 is a layout of actuators depicting various parabolic solutions for determining an impact point.

In this situation, the chances of false positioning are small because the chance of 4 hyperbolas intersecting at the reference point 10 and another point is very small. FIG. 2 shows a common case utilizing the same set of transmitters 12, 14, 16, 18, 20 and same reference point 10, except that in this case, the signals from transmitters 12 and 14 are blocked by a hill 21 for a receiver located at location 9 in the figure. FIG. 3 illustrates what can happen in this case if only three transmitters are received. Each of the hyperbolas (22,23,24) in FIG. 3 are the loci of points along which the timing relationship between a pair of transmitters remains constant. The hyperbolas (22,23,24) intersect at the reference point 10 and at another point called the false reference point 9. Since both points reside on the same hyperbolas (22,23,24), location 9 is a false reference point and a receiver near that point may resolve its location incorrectly to the reference point 10.

Under many conditions the false reference point 9 is sufficiently far away that the chance of a positioning receiver being near it is small, but in many cases such as real-time tracking applications, it is important to prevent gross positioning errors. Since computation of the intersection of a pair of hyperbolas is not directly solvable, this invention utilizes the asymptotes of the hyperbolas to estimate the location of a false reference point and prevent the system from computing a position if the possibility of a false positioning is too high.

Figure 4:
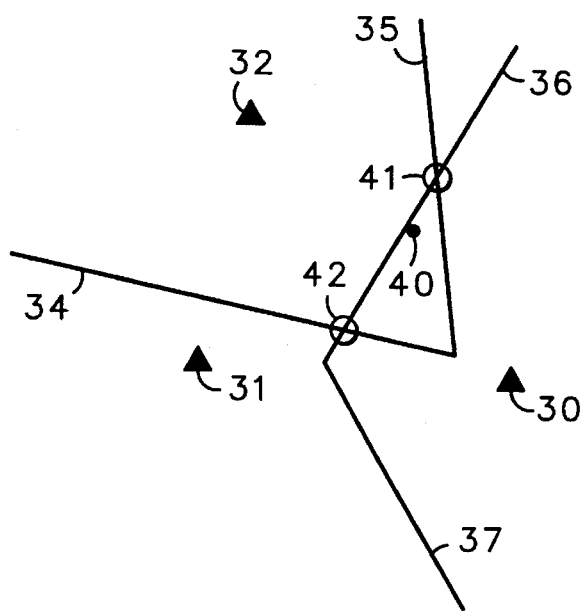
FIG. 4 is a layout depicting use of asymptotes for finding the true location of troops and vehicles on a battle field.

Using transmitter 30 in FIG. 4 as the timing reference for a self-positioning receiver, the foci of two hyperbolas are transmitters 30 and 31 for the first hyperbola, and transmitters 30 and 32 for the second hyperbola. By definition, both hyperbolas pass through the reference point 40. Rotating and translating the coordinates around the midpoint of each hyperbola gives the definition of the asymptotes as the lines defined by the equations:

$$y = (+b/a)x \quad (1)$$

and $$y = (-b/a)x \quad (2).$$

For the first hyperbola defined by transmitters 30 and 31, the vertices (+a, 0) (−a,0) are defined by the equation:

$$a = abs(D1P - D2P)/2) \quad (3),$$

where P is a known point on the hyperbola (reference point 40), D1P is the distance from transmitter 30 to P, and D2P is the distance from transmitter 31 to P. The asymptotes 36 and 37 are the result.

Likewise, the asymptotes 34 and 35 can be computed based on the interaction between transmitters 30 and 32. Once asymptotes are determined, an estimation of the false reference point 42 can be found simply by determining the intersections of the asymptotes. In this case, the false reference point 42 is relatively close to the true reference point and the chances that any self-positioning receivers are in the area is high and any positions generated with only those three transmitters should not be used. It should be noted that an estimated reference point 41 is not at the true reference point 40 due to the fact that the asymptote approximations of the true hyperbolas are greatest nearer the foci.

Figure 5:
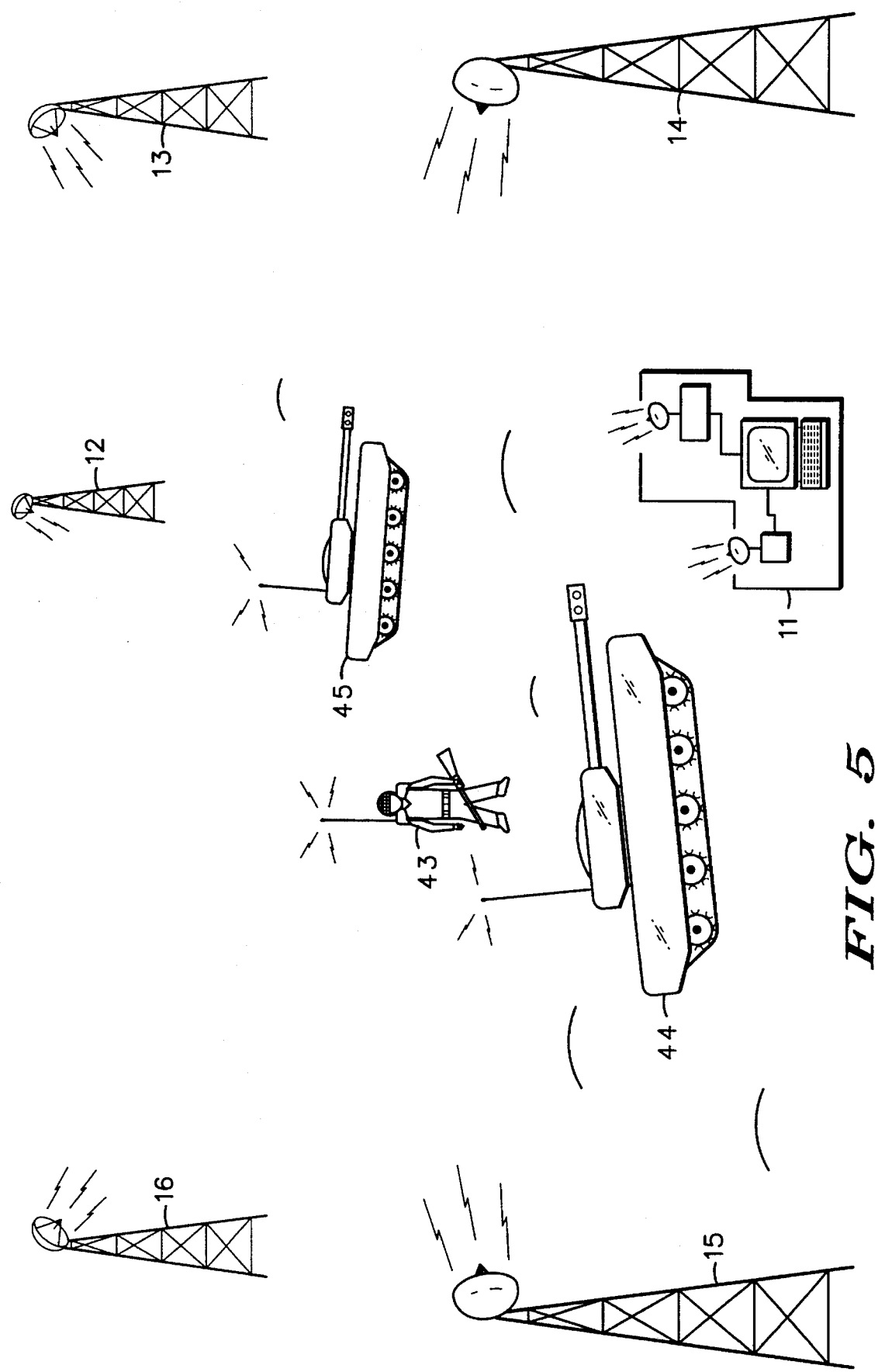
FIG. 5 is a layout of a simulated battlefield in accordance with the present invention.

FIG. 5 shows a typical simulated battlefield system architecture in which this invention can be implemented. Relay transmitters 12, 13, 14, 15, and 16 are ground based transmitters from which timing data is transmitted to a number of self-positioning receivers 43, 44, and 45 that receive timing transmissions and compute their position based on the timing relationships of the signals received. The system may be controlled by a master control station 11 or the relay transmitters 12, 13, 14, 15, and 16 may transmit autonomously based on a common system clock. There are several existing systems that meet this description and the CATIES systems at the US Army National Training Center currently provides this basic positioning system which the present invention improves.

The following figures describe three implementations of this invention that each predict the possibilities of false positions being computed based on the processing power available at the various system components.

Figure 6:
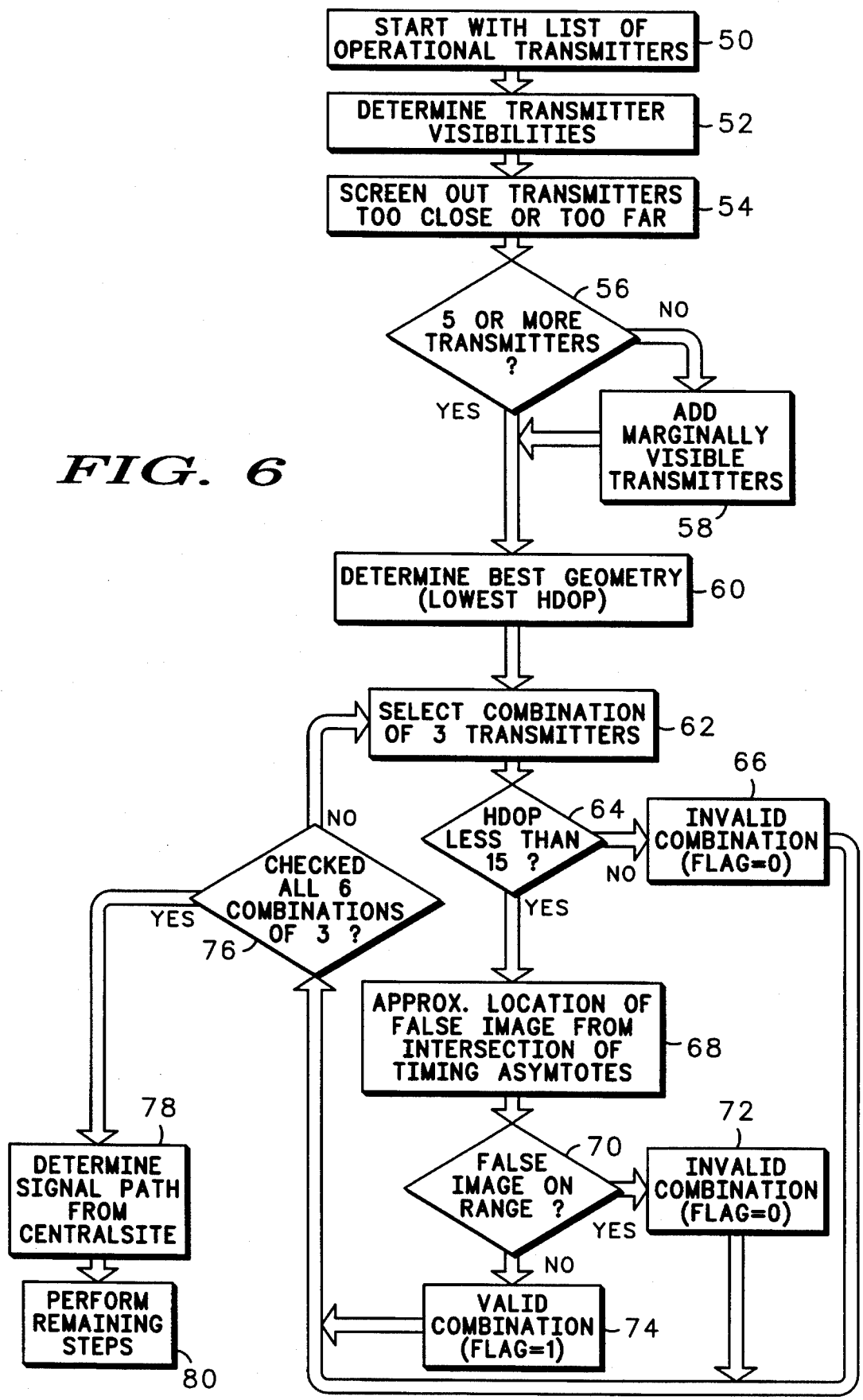
FIG. 6 is a flowchart of an embodiment of position location method in accordance with the present invention.
Figure 7:
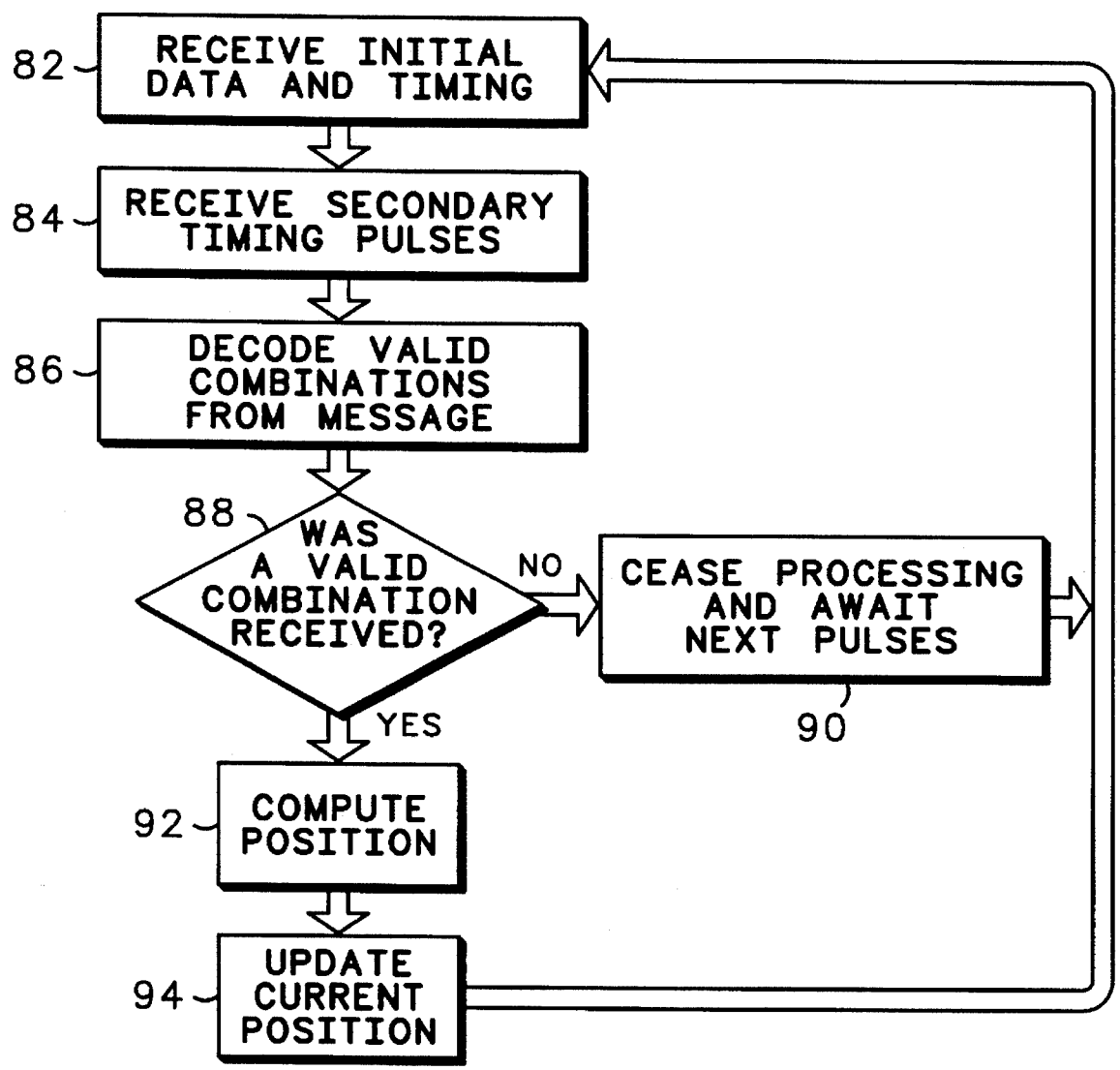
FIG. 7 is a flowchart of a self position location method for receivers in accordance with the present invention.

FIG. 6 describes an implementation of the present invention performed by a master control station 11 of FIG. 5 in conjunction with the method described in FIG. 7 and implemented in self-positioning receivers 30, 31, and 32 that minimizes the processing required in either system element.

In this implementation, the master control station 11 determines which transmitters to use, based on their operational status (step 50), predicted RF line of sight (step 52), and proximity (step 54). In this implementation, the number of transmitters is limited to 5 so the master control station 11 may add transmitters (steps 56 and 58) to add marginally visible transmitters. The master control station 11 then computes the best sequence of 5 based on a standard geometrical rating system such as Horizontal Dilution Of Precision (HDOP) (step 60). This step provides the sequence with a list of transmitters that minimizes positioning errors in the vicinity of the reference point 35. This list is the relay transmitters 12, 13, 14, 15, and 16.

The next step includes selecting each combination of three transmitters that may be received by the self-positioning receivers 30, 31, and 32 (step 62) and then calculating the location of a false reference point. In this implementation, there are six possible combinations since the first signal must be received in this type of system in order for a position to be computed.

The method is performed on each combination of 3 transmitters individually since it cannot be predicted which signals will be received due to local blockages that may occur at each self-positioning receiver 30, 31, and 32. Each combination of three transmitters will be labeled as being valid or invalid based on the following criteria.

First, the HDOP of the three transmitters is computed in (step 64) with reference to the reference point 35. If the HDOP is too high, the likelihood of an accurate position being computed is low so the combination will be labeled as invalid in (step 66) and the method will check the next combination of three transmitters (if any) as shown in (step 76).

If the HDOP is low enough, the asymptotes are computed and the location of the false reference point is approximated in (step 68). Step 70 then determines whether the false reference point is on the test range (simulated battlefield or a bounded area) where self-positioning receivers 31, 31, and 32 are allowed. If not, the combination is labeled as valid in (step 74). If the false reference point is on the range, the combination is labeled as invalid in (step 72). In both cases, processing proceeds to (step 76) to see if all combinations have been tested or not. If not, the next combination of three transmitters is selected and (steps 62 through 76) are repeated.

Once all combinations of three transmitters have been tested, the master control station 11 determines routing (step 78) of the signals to transmit timing messages from the five relay transmitters 12, 13, 14, 15, and 16. Step 80 performs the routing. The typical timing data with the addition of the six valid/invalid flags computed in the previous steps is then transmitted to the self-positioning receivers in step 80.

FIG. 7 shows the steps performed by the self-positioning receiver 30, 31, and 32 when timing data is received from three or more relay transmitters 12, 13, 14, 15, 16 (step 82). The data and timing from the initial message sent by relay transmitter 12 is decoded, followed by subsequent timing pulses from relay transmitters 13, 14, 15, and/or 16 as shown in (step 84). Next, the valid combinations computed by the master control station 11 are decoded from the received message in (step 86). If any valid combination of three signals was received in (step 88), processing transfers to (step 92) to compute current position and the current position is updated in (step 94). If no valid combinations of three signals was received, the processing is aborted and the self-positioning receiver waits for later messages (step 90).

Figure 8:
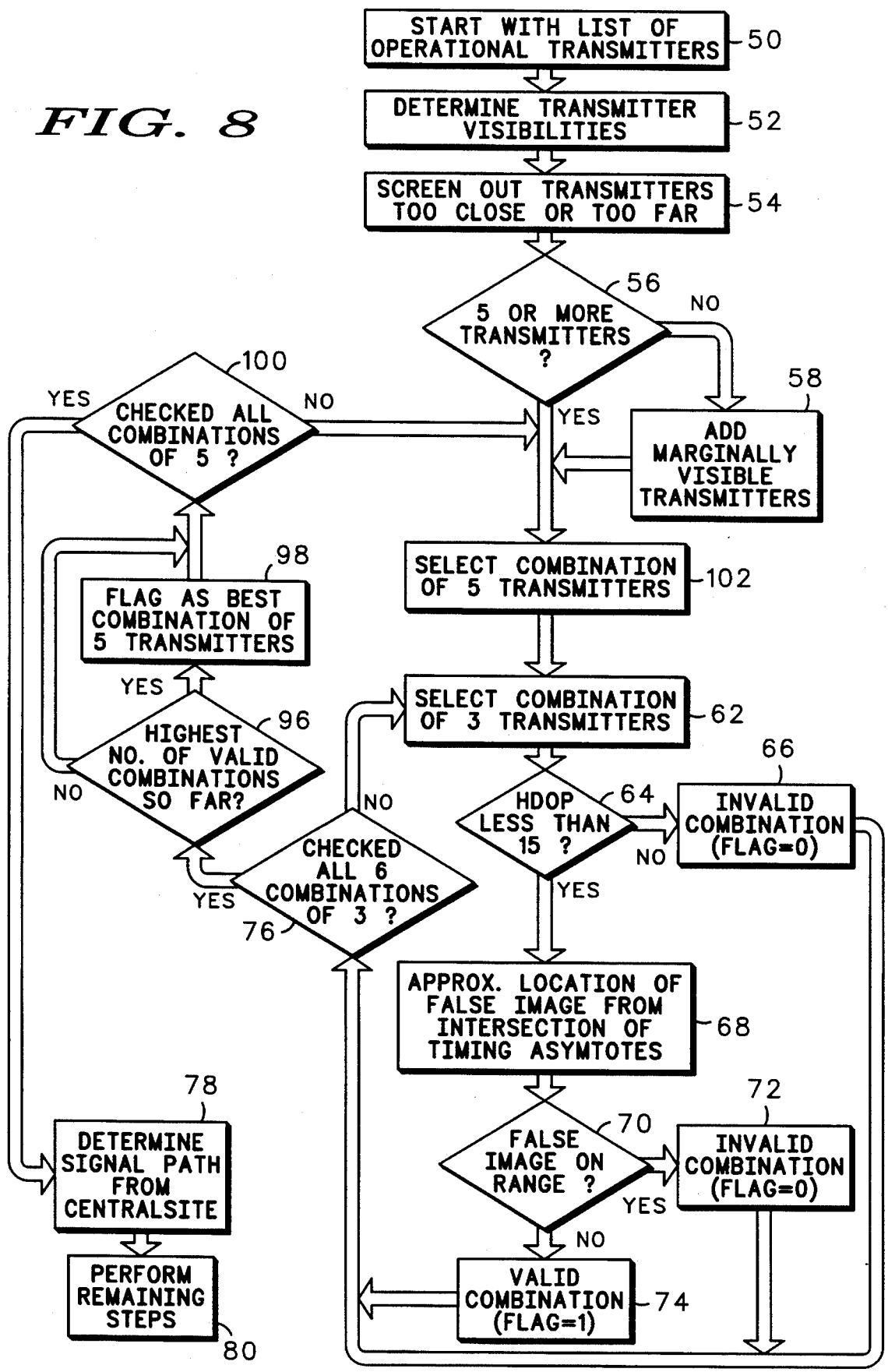
FIG. 8 is a flowchart of another embodiment of a position location method in accordance with the present invention.

FIG. 8 demonstrates another implementation in which the master control station 11 calculates false reference points for all possible combinations of transmitters and uses the optimum set of transmitters to prevent false positions. This implementation requires significantly more processing time at the master control station but offsets an effective decrease in system coverage caused by simply filtering the output of the normal system calculations described in steps 50 through 60 in FIG. 6. In this implementation, the combination of 5 transmitters with the highest number of valid combinations will be used since it is the combination that provides the highest amount of immunity to two of the signals being blocked at the self-positioning receivers 30, 31, and 32. The same method described in FIG. 7 is implemented in the self-positioning receivers 30, 31, and 32.

Another implementation of this invention is shown in FIG. 8, (steps 50 through 58) are repeated so that a list of transmitters likely to be received at the reference point is generated. Instead of using a geometric rating such as HDOP, all combinations of 5 transmitters are tested individually for their ability to prevent false positions, (step 102). In cases where there are 9 or more available transmitters, the number of combinations may be quite large. Steps 62 through 76 are performed as described in FIG. 6 for the each combination of 5 transmitters. After each combination is tested, the number of valid combinations (x out of 6) is compared with the greatest number of combinations so far (step 96). If the number of valid combinations is higher than any of the previous sets of 5, it is flagged in (step 98). In either case, processing is resumed at (step 100) to determine if all combinations of 5 transmitters have been tested. If not, the next combination of 5 transmitters is selected in (step 94) and s((steps 94 through 100) are repeated. Once all combinations have been tested in (step 100), (steps 78 and 80 of FIG. 6 are repeated to route the signals and transmit the data to the self-positioning receivers 30, 31, and 32.

Figure 9:
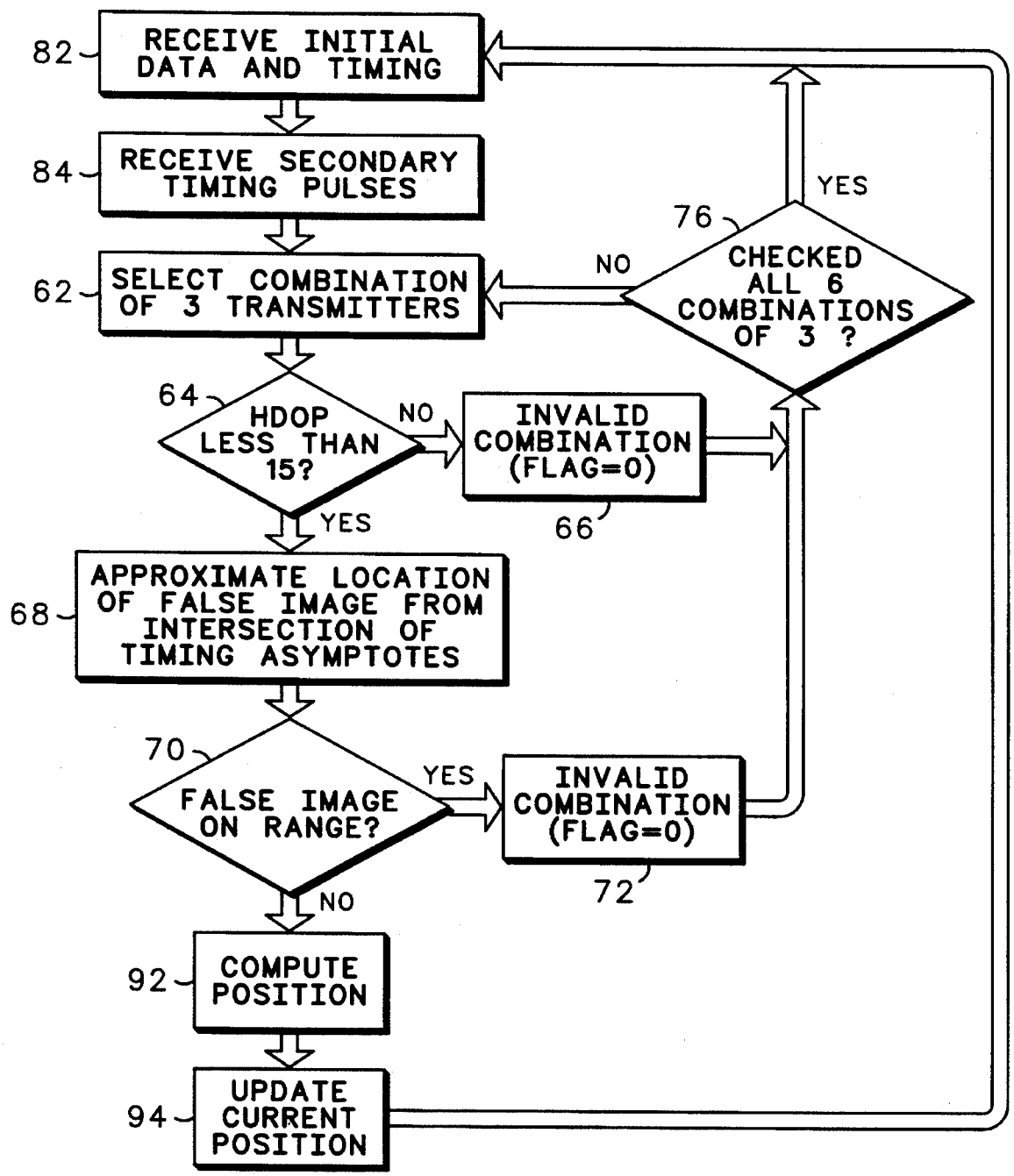
FIG. 9 is a flowchart of another embodiment of a position location method of in accordance with the present invention.

FIG. 9 shows another implementation that does not depend on the master control station 11 and can be implemented in the self-positioning receivers 43, 44, and 45. This is useful in systems where sufficient processing is available at the self-positioning receivers 43, 44, and 45, or where timing transmissions are not controlled by a master control station 11, such as a system in which relay transmitters 12, 13, 14, 15, and 16 transmit autonomously based on a common system clock. In this implementation, (steps 82 and 84) of FIG. 7 are repeated to receive the initial and secondary timing pulses. If the initial relay transmitter 12 and 2 to 4 of the relay transmitters 13, 14, 15, or 16 are received, the same (steps 62 through 76) that were implemented in the master control station in FIG. 6 are implemented to test each of the combinations of three transmissions with one exception. The exception is that once any valid combination of three signals is detected, the steps to compute and update the self-positioning receiver 43, 44, or 45's position is performed. These are the same steps 92 and 94 as performed in FIG. 7. If no valid combinations are received or a valid combination is received and the position is computed, the processing returns to await the next set of timing transmissions.

This invention provides immunity from false positioning utilizing relatively simple calculations in real time for most existing types of positioning systems and may be implemented centrally or distributed, depending on the processing capabilities of the system elements. By filtering out situations that are likely to cause false positions to be computed, the overall positioning reliability of the system in real situations is enhanced by taking into account local blockages caused by terrain, buildings, vehicles, etc. that occur in most systems.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A method for eliminating ambiguous positions in a hyperbolic positioning system including a master control station, a plurality of transmitters for transmitting timing information to a device for self-determining its position, said method comprising the steps of:

selecting by said master control station a group of said transmitters which are in an RF line of sight of a target;

estimating by the master control station a true position and a false position on an intersection of hyperbolic asymptotes of at least two pairs of the plurality of transmitters;

determining by the master control station whether said false position is within a predetermined range of said actual position; and transmitting by said master control station to said device for self-determination valid sets of transmitters which are capable of unambiguously providing said true position of said device for self-determining its position.

2. The method for eliminating ambiguous positions in a hyperbolic positioning system as claimed in claim 1, wherein said step of selecting by the master control station includes the step of selecting at least five operational transmitters.

3. The method for eliminating ambiguous positions in a hyperbolic positioning system as claimed in claim 2, wherein there is further included the step of adding marginally visible transmitters to form said at least five transmitters, if said at least five transmitters which are not marginally visible cannot be found.

4. The method for eliminating ambiguous positions in a hyperbolic positioning system as claimed in claim 3, wherein there is further included the step of determining an optimum geometry of said at least five transmitters by choosing said at least five transmitters having a minimum horizontal dilution of precision.

5. The method for eliminating ambiguous positions in a hyperbolic positioning system as claimed in claim 4, wherein said step of estimating includes the steps of:

selecting by said master control station a combination of three transmitters of said at least five transmitters;

determining whether a horizontal dilution of precision of said selected three transmitters is less than a predetermined number; and setting a flag, if said horizontal dilution of precision is greater than or equal to said predetermined number.

6. The method for eliminating ambiguous positions in a hyperbolic positioning system as claimed in claim 5, wherein said step of determining by the master control station whether said false position includes the steps of:

approximating by the master control station a location of said false position from intersection of timing asymptotes;

determining by the master control station whether said false position is within a bounded area; and setting a flag, if said false position is within the bounded area.

7. The method for eliminating ambiguous positions in a hyperbolic positioning system as claimed in claim 6, wherein there is further included the step of setting a flag indicating a valid combination of three transmitters has been obtained, if said false position was not within the bounded area.

8. The method for eliminating ambiguous positions in a hyperbolic positioning system as claimed in claim 7, wherein there is further included the step of determining whether all combinations of three transmitters of said at least five transmitters has been tested.

9. The method for eliminating ambiguous positions in a hyperbolic positioning system as claimed in claim 8, wherein there is further included the step of iterating the steps of: selecting three transmitters of said at least five transmitters; determining whether a horizontal dilution of precision; setting a flag; approximating by the master control station a location; determining by the master control station whether said false position; setting a flag; setting a flag indicating a valid combination; and determining whether all combinations of three transmitters, if all combinations of three transmitters of said at least five transmitters have not been tested.

10. The method for eliminating ambiguous positions in a hyperbolic positioning system as claimed in claim 8, wherein there is further included the step of selecting combinations of five transmitters for testing.

11. The method for eliminating ambiguous positions in a hyperbolic positioning system as claimed in claim 10, wherein there is further included the step of determining a greatest number of valid combinations of transmitters for each combination of five selected transmitters.

12. The method for eliminating ambiguous positions in a hyperbolic positioning system as claimed in claim 11, wherein there is further included the step of setting a flag, if a particular combination of five transmitters has the greatest number of valid combinations.

13. The method for eliminating ambiguous positions in a hyperbolic positioning system as claimed in claim 12, wherein there is further included the steps of:

determining whether all possible combinations of five transmitters have been tested; and iterating said steps of selecting five transmitters; determining a greatest number of valid combinations; setting a flag; and determining whether all possible combinations of five transmitters, if all combinations of five transmitters have not been tested.

14. The method for eliminating ambiguous positions in a hyperbolic positioning system as claimed in claim 7, wherein:

said step of transmitting by the master control station includes the step of transmitting messages including: identities of valid and invalid combinations of said three transmitters of said at least five transmitters and transmitting said flag indicating invalid and valid combinations of said three transmitters; and receiving by said device for self-determining said messages including said valid and invalid combinations of three transmitters of said at least five transmitters and said flags indicating invalid and valid combinations.

15. The method for eliminating ambiguous positions in a hyperbolic positioning system as claimed in claim 14, wherein there is further included the step of decoding by said device for self-determining valid combinations of said three transmitters from said messages transmitted from said master control station.

16. The method for eliminating ambiguous positions in a hyperbolic positioning system as claimed in claim 15, wherein there is further included the step of determining by said device for self-determining whether at least one valid combination of said three transmitters was received by said device for self-determining.

17. The method for eliminating ambiguous positions in a hyperbolic positioning system as claimed in claim 16, wherein there is further included the step of waiting by said device for self-determining for a subsequent message from said master control station, if no valid combinations of three receivers were determined.

18. The method for eliminating ambiguous positions in a hyperbolic positioning system as claimed in claim 17, wherein there is further included the steps of:

determining by the device for self-determining a current position of said device for self-determining; and updating by the device for self-determining a position of said device for self-determining to be the current position of said device for self-determining.

19. A method for eliminating ambiguous positions in a hyperbolic positioning system including a master control station, a plurality of transmitters for transmitting timing information to a device for self-determining its position, said method comprising the steps of:

selecting by the device for self-determining a group of said transmitters which are in an RF line of sight of a target;

estimating by the device for self-determining a true position and a false position on an intersection of hyperbolic asymptotes of at least two pairs of the plurality of transmitters;

determining by the device for self-determining whether said false position is within a predetermined range of said actual position;

determining by the device for self-determining whether at least one valid combination of said three transmitters was received; and determining by the device for self-determining a current position of said device for self-determining.

20. In a battlefield simulation system including a master control station, a plurality of transmitters for transmitting timing information to plurality of personnel and vehicles, each having location detection devices, a position location method for self-locating each location detection device, said position location method comprising the steps of:

selecting by said master control station a group of said transmitters which are in an RF line of sight of a target;

estimating by the master control station an true position and a false position on an intersection of hyperbolic asymptotes of at least two pairs of the plurality of transmitters;

determining by the master control station whether said false position is within a predetermined range of said actual position;

transmitting by said master control station to said device for self-determination valid sets of transmitters which are capable of unambiguously providing said true position of said device for self-determining its position;

determining by said location detection device whether at least one valid combination of said three transmitters was received;

determining by the locations detection device for self-determining a current position of said device for self-determining; and updating by the location detection device a position of said location detection device to be the current position of said location detection device.

* * * * *